UNITED STATES PATENT OFFICE.

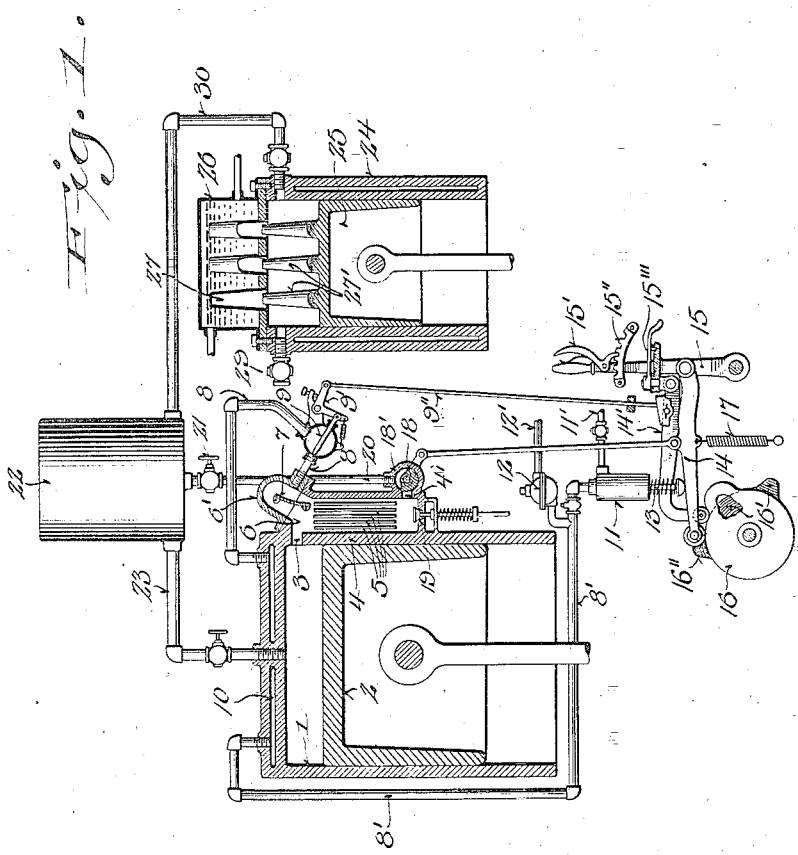

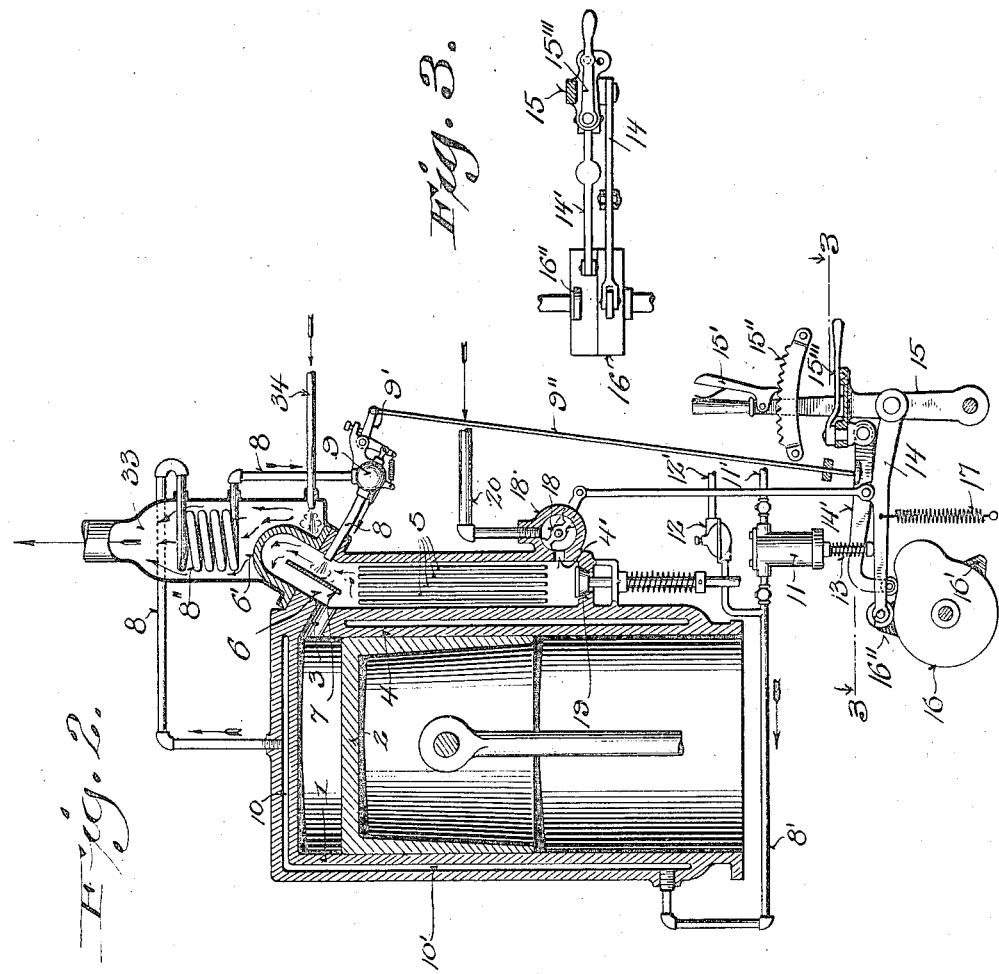

JOSEPH KOENIG, OF TWO RIVERS, WISCONSIN.

INTERNAL-COMBUSTION ENGINE.

1,127,642.　　　　　Specification of Letters Patent.　　Patented Feb. 9, 1915.

Application filed April 1, 1913. Serial No. 758,111.

*To all whom it may concern:*

Be it known that I, JOSEPH KOENIG, a citizen of the United States, and resident of Two Rivers, in the county of Manitowoc and State of Wisconsin, have invented certain new and useful Improvements in Internal-Combustion Engines; and I do hereby declare that the following is a full, clear, and exact description thereof.

My invention in a general way refers to internal combustion engines of that character disclosed in an application for patent filed by me March 7, 1911, Serial No. 612,878, for improvements in internal combustion engines.

In the above referred to application I employ a working cylinder and an artificially cooled compression cylinder, which cylinders are directly connected by means of a passage or chamber containing thermal bodies. Charges of compressed air, reduced in temperature, are discharged from the compression cylinder into the working cylinder through the passage, the air being heated in its travel therethrough and converted into a gaseous vapor by means of the admission of oil thereto, after said air has traveled through the passage. Succeeding this operation the hot spent gases resulting from a subsequent explosion are expelled from the working cylinder through the thermal passage, from which passage they are scavenged by a suitable valve controlled port, whereby the thermal bodies contained in said passage will absorb a large percentage of heat that is given off incidental to the travel of a fresh charge of air through said passage.

My present invention has for its general object to increase the efficiency and scope of engines of the above referred to type.

Specific objects of my invention are to provide a storage reservoir for the reception of cool compressed air that is delivered thereto directly from a compressor, said compressor being equipped with a cooling medium whereby the air is lowered in temperature during compression; to provide a throttle valve for controlling communication between the air storage reservoir and thermal chamber, through which chamber the air is arranged to travel prior to being delivered to the firing head of the engine cylinder; to provide a balanced cut-off valve for controlling the admission of air from the reservoir to the thermal passage, the said valve being preferably of the oscillatory type and so balanced that it will compensate pressure in either direction; to provide an actuating means for the cut-off valve and reversing gear for the actuating means, whereby the utility of the engine is increased in scope, the said reversing mechanism rendering it possible to utilize engines of this type for marine propulsion; to provide a direct valve-controlled pipe connection between the reservoir and engine cylinder, whereby the engine may be initially started through the introduction into its firing head of compressed air as a starting medium; to increase the fuel efficiency by the economic introduction of a heating medium to said fuel, whereby the temperature of the same is raised to effect vaporization before it is discharged into the thermal passage, in which passage it is met by a charge of superheated air to supply the proper amount of oxygen, and to provide means for causing the vaporized oil to be discharged into the mixing chamber of the thermal passage in pulsating jets that are synchronized with the movement of the engine piston and also the controlling valve which supplies air to the thermal passage.

With the above and other minor objects in view the invention consists in certain peculiarities of construction and combination of parts as set forth hereinafter with reference to the accompanying drawings and subsequently claimed.

In the drawings Figure 1 represents a diagrammatic view of one form of an engine embodying the features of my invention, certain of the parts being in section to more clearly illustrate structural features, and Fig. 2, a similar diagrammatic view illustrating my preferred form of fuel oil distribution, and Fig. 3, a sectional plan view of a reversing gear, the section being indicated by line 3—3 of Fig. 2.

Referring by characters to Fig. 1 of the drawings, 1 represents an engine cylinder which may be suitably jacketed for cooling purposes, and 2 a piston therefor. The firing head of the cylinder is provided with a port 3 communicating with the discharge end of a thermal chamber or passage 4, into which passage is arranged a series of thermal plates 5. The discharge end of the passage is expanded to form a mixing chamber 6, the head 6' of the same constituting a hot bulb, by means of which bulb the gas mixture is exploded. The mixing chamber 6 of the thermal passage as shown, is preferably provided with a baffle-plate 7, whereby air discharged from between the thermal plates of the passage is deflected toward the nozzle of an oil feed pipe 8, through which vaporized fuel oil is supplied in the desired quantity for producing the carbureted mixture. The oil feed-pipe 8 communicates with an oil channel 10 that is formed in the engine cylinder, the said fuel pipe being provided with a mechanically actuated valve 9, whereby the flow of oil is controlled. A branch supply-pipe 8' is connected to a pump 11, which pump is supplied with oil by means of a check valve controlled pipe 11' that leads from a suitable reservoir, not shown. The branch supply-pipe 8' is also provided with a check-valve and a pressure regulating valve 12, from which valve a return pipe 12' leads back to the reservoir referred to. As shown, the pump 11 is provided with a spring-controlled piston-rod 13, the end of which rod engages a rocker-arm 14 that is fulcrumed upon a reverse lever 15 which may be adjusted forward or backward and locked in its adjusted position by a dog 15' that engages a toothed sector 15''. The free end of the rocker-arm carries an anti-friction roller which is held against the face of an actuating cam 16 by a coiled spring 17. This actuating cam 16 may be directly connected to the crank-shaft of the engine (not shown) or otherwise driven in synchrony therewith, it being understood that where more than one cylinder is employed that each of the same are provided with separate cam-controlled valve gearing. The valve 9 which controls the supply of oil vapor, as shown, is connected to a spring-controlled bell-crank 9', one arm of the same having linked thereto a thrust-rod 9'', which thrust-rod is adapted to engage a rocker-arm 14'. The said rocker-arm is connected to the reverse lever 15 in a similar manner to that previously mentioned in connection with the rocker-arm 14. The end of the rocker-arm 14' also carries an anti-friction roller which is adapted to be engaged by a second cam 16' that is rotative with the cam 16, its high point being rocked back of the high working point of the said cam. Hence it is apparent that the action of the cam surfaces will first impart motion to the rocker-arm 14, whereby air is admitted to the thermal passage and coincident to closing of the air-controlling valve 18 the cam 16' will act upon the rocker-arm 14', whereby a jet of vaporized oil is discharged into the mixing chamber 6. The regulator valve 12 is provided for relieving abnormal pressure in the oil-supply system, it being set to open when the pressure of the oil reaches a predetermined degree, whereby said oil is forced back into the reservoir through the return-pipe 12'. It is also apparent that I may in some instances employ any well-known type of governor for controlling the opening of the valve 9 and in order to provide an adjustment for said valve to regulate the supply of oil the rocker-arm 14' is equipped with a shoe, whereby it may be set to increase or diminish the play of the needle-point of said valve, it being understood that said rocker-arm is advanced and retracted in a reversing operation with its companion rocker-arm 14. Thus when the lever 15 is actuated to throttle the air-valve 18 for low speed, the fuel valve is correspondingly restricted in its feed.

The receiving end of the thermal passage 4 is provided with a port 4', which port is controlled by an oscillatory valve 18 that is preferably of the butterfly type, the same being mounted in a valve-casing 18'. The said receiving end of the thermal passage is also provided with a valve-controlled exhaust port 19 through which the spent gases are discharged. Air is admitted to the valve-casing 18 through a pipe 20, which pipe is provided with a throttle-valve 21 and communicates with an air storage reservoir 22, the valve being supplied for the purpose of regulating the amount of air to be discharged into the thermal chamber during a known interval of time incidental to the port 4' being open. The reservoir 22 also has a valve-controlled branch-pipe 23 that is in direct communication with the firing head of the cylinder, it being understood that this branch-pipe may be provided with couplings corresponding in number to the cylinders of the engine.

In order to maintain a constant supply of air, under the desired pressure, to the reservoir 22 I provide a compressor cylinder 24, which cylinder is preferably equal in area to one-half of the engine cylinder, in order to obtain the most efficient and economical results. The compression cylinder is provided with a piston 25, the same being operated through a pitman connection to the engine crank-shaft (not shown). It should be understood, however, that any means for utilizing the engine power to drive the compressor may be employed without departing from the spirit of my invention. It is also apparent that under the conditions explained that the timing of the compressor and engine pistons is immaterial.

In order that the power to drive the compressor may be reduced to a minimum I provide means for effectually cooling the air incidental to its compression. This means comprises a water-jacketed head 26 for the compressor cylinder, which head carries a series of hollow thimbles 27 that project into the chamber portion and about which a cooling fluid is introduced. Thus the cooling surface is materially increased in proportion to the size of the head.

In order to effect a displacement of all of the compressed charge, the piston 25 is provided with a corresponding series of spurs 27' which enter the thimbles and thus effectually displace all air when the compressor cylinder has completed its working stroke. By this arrangement it is apparent that a charge of air introduced through the valve-controlled nipple 29 is compressed and reduced in temperature during such compression, owing to the large area of the cooling surface, the compressed charge being thereafter expelled into the air reservoir 22 through a valve-controlled pipe 30.

Fig. 2 illustrates my preferred form of fuel oil distribution, the arrangement and construction being such that the fuel oil is first heated to a vaporizing point, by circulating about the engine cylinder and thereafter superheated before being discharged into the mixing chamber of the thermal passage.

The preferred construction for accomplishing the above result comprises a jacket which entirely envelops the engine cylinder to form an oil chamber 10', which oil chamber surrounds the side walls and head of the cylinder. The oil is fed to the chamber 10' through a valve-controlled supply-pipe 8', whereby the temperature of the oil in said chamber is increased to a vaporizing point. The vaporized oil is thereafter delivered from the top of the chamber 10' through the fuel-pipe 8, which pipe in this instance passes into a vent-stack 33 and is there wound in a series of coils 8'', the ends of the coiled series being extended out through the stack, from which point the supply-pipe 8 terminates with the valve-controlled nozzle that is arranged to discharge into the mixing chamber of the passage 5 in a similar manner to that described in connection with Fig. 1 of the drawings. The gas-pipe 34 is extended into the stack 33 and is arranged with a tip which is adapted to discharge a flame upon the bulb 6', whereby said bulb is heated to the desired temperature in order to effect an explosion of the gases therein.

From the foregoing description it is apparent that at the completion of the exhaust stroke of the engine piston the spent gases will be forced through the passage and discharged through the valve-controlled port 19, it being understood that the valve of said port is positively opened at the desired time by mechanism not shown. At this time the exhaust valve is closed and simultaneously the controlling valve 18 is opened, whereby a charge of compressed air is caused to travel upwardly and between the thermal plates. These plates, having previously been heated by the spent gases, will thus heat the air and cause the same to expand materially as it reaches the explosion chamber 6, it being understood that a small quantity of the hot spent gases which are retained in the passage now commingle with the compressed air. The said air, after reaching the explosion chamber of the passage is deflected past the mouth of the oil discharge pipe 8, which pipe at the same time will deliver a jet of oil through action of the pump, which action is effected by the cam 16' being timed with relation to movement of the engine piston. Hence the quantity of vaporized oil discharged at this time against the incoming air will be immediately mixed with air and coming in contact with the hot bulb, the said carbureted air is exploded, the force of which explosion is exerted upon the head of the engine piston, whereby a working stroke will result. It should be understood also that coincident to the discharge of the fine jet of oil vapor into the mixing chamber that the controlling valve 18 will be closed, oscillatory movement of which valve being imparted thereto through the rocker-arm 14 which is in link connection with said valve. By coiling the oil supply-pipe 8 within the stack 33 it is manifest that said oil, after being heated through contact with the engine cylinder, is superheated to a certain degree through the influence of the exhaust heat which travels through the stack from the gas jet that serves to maintain the bulb at the desired temperature.

In order to effect proper timing relations between the oil-supply valve 9 and the valve 18 in reversing the engine, a third cam 16'' is mounted upon the cam-shaft upon a different plane than the cam 16', as best shown in Figs. 2 and 3 of the drawings. The pivot point of the rocker-arm 14' is also, as shown, arranged to be oscillated horizontally by a detent lever 15''', which lever is adapted to be locked into either of a pair of sockets that are formed in a web of the reversing lever 15. By this arrangement the rocker-arm 14' can be shifted with relation to its horizontal plane, whereby the anti-friction roller at its end will engage either the cam-surface 16' or the cam-surface 16'', these two points being positioned equal distances from the center point of the high working face of cam 16. Hence when the position of the mechanism is changed for reversal the rocker-arm 14' is positioned so as to act in timed relation with the rocker-arm 14 when the engine is at high or low speed forward or is reversed.

While I have shown and described a heated bulb for exploding the gases, it is apparent that I may, in some instances, employ any other well known means for generating a spark, whereby said gases are ignited.

I claim:

1. An internal combustion engine comprising a cylinder, a piston, therefor, a thermal passage having its discharge end in communication with the firing head of the cylinder, an air storage reservoir in communication with the air receiving end of the passage, a controlling valve for said air, actuating mechanism for the controlling valve, a valve-controlled exhaust port in communication with the air-receiving end of said passage, oil supply means in communication with the discharge end of the passage, a compressor in communication with the air reservoir, and a cooling medium disposed about the head of the compressor.

2. An internal combustion engine comprising a cylinder, a jacket disposed about the cylinder to form an oil chamber, a piston for the cylinder, a passage having its discharge end in communication with the firing head of the cylinder, an air storage reservoir in communication with the air-receiving end of the passage, a controlling valve for said air, a valve-controlled exhaust port in communication with the air-receiving end of said passage, a bulb-head for the discharge end of the passage, means for supplying a jet-flame to the bulb, a stack disposed about said bulb and jet-flame, means for supplying oil to the chamber about the cylinder, an oil delivery pipe in communication with the cylinder chamber and discharge end of the passage, the oil-delivery pipe being provided with a coil within the stack, a pump in communication with the oil delivery pipe, and means for actuating the pump in synchrony with the engine piston.

3. An internal combustion engine comprising a cylinder, a piston therefor, a passage having its discharge end in communication with the firing head of the cylinder, a compressed air reservoir in communication with the intake end of the passage, a controlling valve for regulating the admission of air to the intake end of said passage, a shiftable gear in connection with the air-controlling valve, whereby the admission of air can be retarded or advanced with relation to the position of the engine piston, a valve-controlled exhaust port in the intake end of the aforesaid passage, a fuel supply means, an oil pump in communication therewith, and means for heating the oil.

4. An internal combustion engine comprising a cylinder, a piston therefor, a thermal passage having its discharge end in communication with the firing head of the cylinder, an air storage reservoir in communication with the air-receiving end of the passage, a valve for controlling the admission of said air to the passage, actuating mechanism for the controlling valve, a cam-controlling reversing gear for the valve-actuated mechanism, a second communication between the reservoir and firing head of the engine cylinder, a manually controlled valve for regulating the admission of air through said communication, means for supplying superheated oil to the discharge end of the before mentioned passage, and a positively actuated valve for controlling said oil supply.

5. An internal combustion engine comprising a jacketed cylinder, a piston therefor, a thermal passage having its discharge end in communication with the firing head of the cylinder, an air storage reservoir in communication with the air-receiving end of the passage, a controlling valve for said air, a reversible actuating gear for the air-controlling valve, a valve-controlled exhaust port in communication with the air-receiving end of the passage, an oil supply means in communication with the jacketed cylinder and discharge end of the passage, a valve for controlling the oil supply to said passage, actuating mechanism for the valve in timed relation with the air-controlled actuating means, means for supplying oil to the cylinder jacket under pressure, and a compressor in communication with the air reservoir.

6. An internal combustion engine comprising a cylinder, a thermal passage having its discharge end in communication with the firing head of the cylinder, an air storage reservoir in communication with the air-receiving end of the passage, a controlling valve for said air, cam actuated mechanism for the controlling valve, a hand-controlled lever for shifting the cam-actuated mechanism, means for locking the lever in different positions, a valve-controlled exhaust in communication with the air-receiving end of said passage, oil supply means in communication with the discharge end of the passage, a valve for the oil supply means, and a cam-controlled actuating mechanism for the oil supply valve in connection with the shifting lever.

7. An internal combustion engine comprising a cylinder, a piston therefor, a thermal passage having its discharge end in communication with the firing head of the cylinder, an air storage reservoir in communication with the air receiving end of the passage, a controlling valve for said air, actuating mechanism for the controlling valve, a valve-controlled exhaust port in communication with the air-receiving end of said passage, oil supply means in communication with the discharge end of the passage, a compressor in communication with the air reservoir, and a reversing gear for the actuating mechanism of the air-controlling valve.

In testimony that I claim the foregoing I have hereunto set my hand at Two Rivers in the county of Manitowoc and State of Wisconsin in the presence of two witnesses.

JOSEPH KOENIG

Witnesses:
 MARCELLA J. GAFFNEY,
 A. H. GLOE.